Jan. 7, 1958  R. L. GREENBERG  2,818,822

MOLD BOARD FOR CONFECTIONERY MACHINE

Filed Nov. 23, 1956

INVENTOR.
Robert L. Greenberg
BY
*Harry Radzinsky*
*attorney*

United States Patent Office 2,818,822
Patented Jan. 7, 1958

2,818,822

MOLD BOARD FOR CONFECTIONERY MACHINE

Robert L. Greenburg, Englewood, N. J., assignor to National Equipment Corporation, New York, N. Y., a corporation of New York Application November 23, 1956, Serial No. 624,048

1 Claim. (Cl. 107—3)

This invention relates to mold boards, and particularly to those of the type adapted for use in confectionery machines, and has for its object the provision of a mold board which can be easily and economically constructed and which will be more useful and efficient than those employed at the present time.

Mold boards as presently used consist of a plurality of spaced-apart strips, usually of wood or metal, attached to a plurality of cross members, the strips having the molds or impression-forming elements attached to them. The molds are primarily employed for forming mold depressions in starch contained in a tray, and the close spacing between the strips of these mold boards permits insufficient air venting between them and also tends to create ridges in the starch which break up and fall into the mold depressions in the starch, thus producing defective candy pieces.

The present invention contemplates the provision of a mold board in which these deficiencies are corrected; which can be economically constructed; which will permit of the use of a substantially increased number of mold projections and possess other advantages apparent to those skilled in this art.

Another object of the invention is to provide a mold board in which the body of the board is composed of a unitary sheet of material, such as plywood, and in which the mold impression members are carried by strip elements produced in the board by transversely-extending slots formed therein.

With these and other objects to be hereinafter set forth in view, I have devised the arrangement of parts to be herein described and more particularly pointed out in the claim appended hereto.

Figure 1:
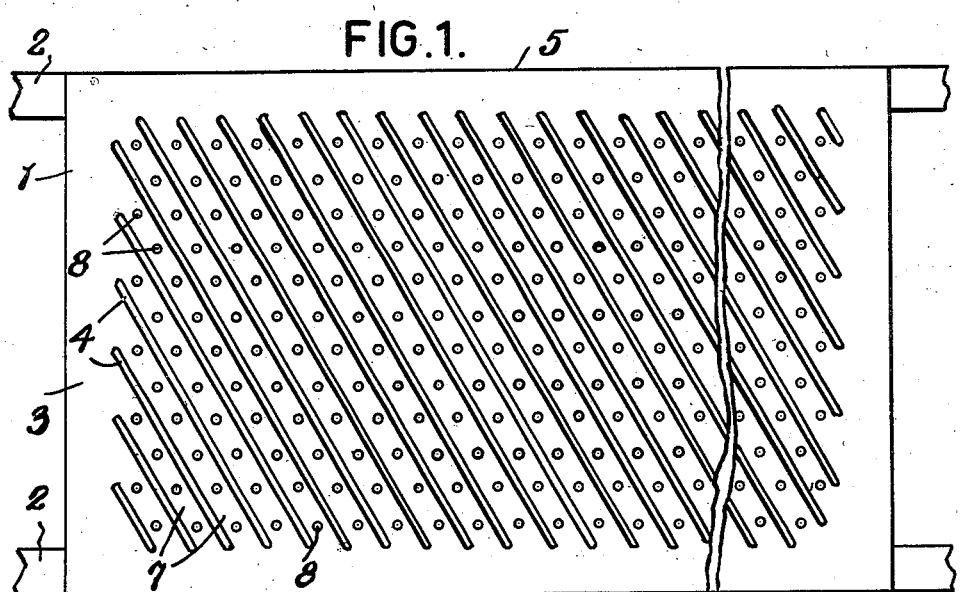
Figure 2:
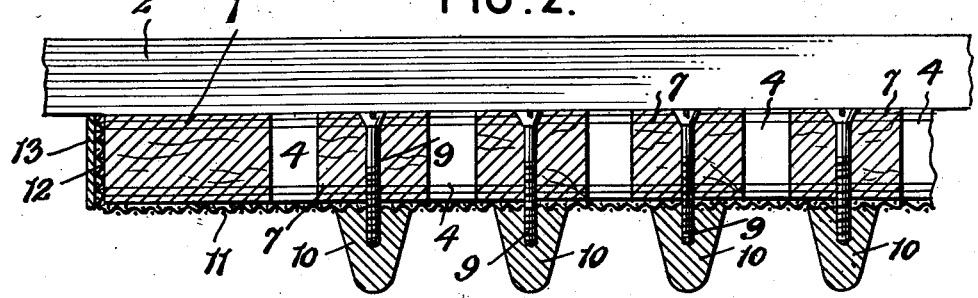
Figure 3:
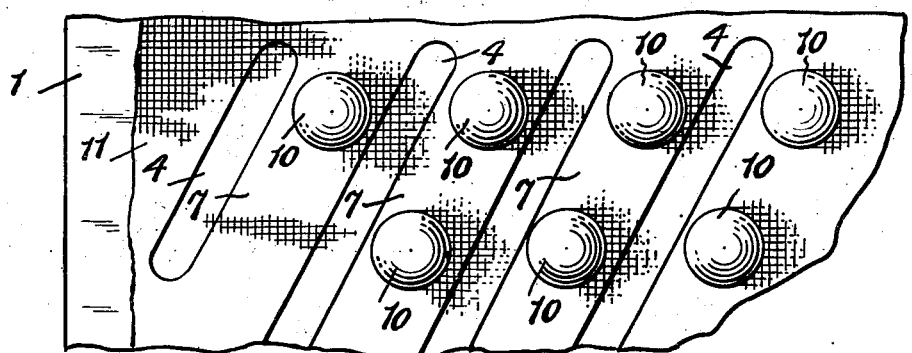

In the accompanying drawing, wherein an illustrative embodiment of the invention is disclosed, Fig. 1 is a bottom view of a mold board before the impression-forming elements have been attached, constructed in accordance with the invention;

Fig. 2 is an enlarged vertical sectional view through a portion of the mold board, and Fig. 3 is a view looking at the under side of a portion of the mold board.

Referring to the drawing, 1 indicates the body member of the mold board, and which is of a size and shape according to the number of mold depressions to be produced in a tray containing starch. The board preferably consists of a sheet of relatively thick plywood supported and reinforced by a plurality of cross bars 2, extended across and secured to its top face 3. The cross pieces, which may be more in number than those shown, are also employed for securing the mold board to the printer.

Extending across the board and shown as being angularly arranged, is a plurality of slots 4, which can be formed by being milled out, said slots having their opposite ends terminating short of the side edges 5 and 6 of the board. While these slots are shown as being angularly arranged they can also be arranged to extend either longitudinally or transversely of the board. By the production of these elongated slots, there is defined in the board a plurality of spaced strips 7, each of which is provided with a line of equally-spaced holes 8 through which screws or similar fastening elements 9 are extended to thereby attach the mold impression-forming elements or projections 10 to the under face of the board. The arrangement illustrated is such that the mold impression-forming elements in each longitudinal line are staggered with respect to those in adjacent lines, but if desired, the mold impression elements need not be so staggered.

Secured on the under face of the board 1, and thus interposed between said face and the mold-impression elements 10, is a foraminous material 11, such as a wire mesh screen, the same being folded up along the side edges of the board, as indicated at 12 and held thereon by the steel strapping 13 screwed or otherwise attached to the edges of the board.

The arrangement above described is such that when the board is used the mold starch will not tend to climb between the strip portions 7 and thus form ridges in the milled-out slots 4, being restrained from doing so by the relatively wide spacing afforded by the slots and by the mesh material. The manner in which the mold elements are attached to the board permits ready interchange of these elements; the manner in which the slots are produced insures accuracy of spacing, and the use of a single board as distinguished from the separate strips commonly employed insures flatness of the board and equal projection of the mold elements therefrom.

Having thus described a single embodiment of the invention, it is obvious that the same is not to be restricted thereto, but is broad enough to cover all structures coming within the scope of the annexed claim.

What I claim is:

A mold board comprising a single sheet of plywood provided with a plurality of angularly-extending, parallel slots closed at their ends by terminating short of the opposite edges of the board, said slots being equally spaced apart and defining strip elements between them, mold impression-members secured to said strip elements, said mold impression-members being arranged in longitudinally-extending rows, with the members in one row being arranged in staggered relation to those in the following row, a mesh material attached to the under side of the plywood sheet and completely covering said under side and located between the sheet and the impression-members, the mesh material being extended along the side edges of the board and means for securing said material along said edges.

References Cited in the file of this patent

UNITED STATES PATENTS

| 428,513 | Overbaugh | May 20, 1890 |
| 528,722 | Holmes | Nov. 6, 1894 |
| 699,687 | Kellogg | May 13, 1902 |
| 1,249,595 | Cameron | Dec. 11, 1917 |
| 2,649,745 | Varak | Aug. 25, 1953 |

FOREIGN PATENTS

| 35,582 | Germany | May 18, 1886 |